United States Patent [19]

Milik

[11] 3,820,760
[45] June 28, 1974

[54] MIXING MACHINES
[75] Inventor: Rudolf F. L. Milik, Welwyn Garden, England
[73] Assignee: Trevor G. Evans, Michael James & Geoffrey Alan Ryder Trading as the Firm of Design Link, Hertfordshire, England
[22] Filed: Jan. 7, 1972
[21] Appl. No.: 216,054

[30] Foreign Application Priority Data
Feb. 9, 1971 Great Britain .................. 4279/71
Apr. 8, 1971 Great Britain .................. 9075/71

[52] U.S. Cl. ................................ 259/8, 259/50
[51] Int. Cl. ......................... B01f 7/16, B01f 15/02
[58] Field of Search .......... 259/8, 43, 44, 161, 162, 259/163, 178 A, 3, 50, 51, 52, 53, 23, 24, 107, 108, 164, 165

[56] References Cited
UNITED STATES PATENTS
3,595,488 7/1971 Blakely et al. ............... 241/46.08 X
3,671,296 6/1972 Funakoshi et al. ................ 259/8 X
3,711,319 1/1973 Irikura ............................ 117/100 B FOREIGN PATENTS OR APPLICATIONS
822,143 10/1959 Great Britain ................. 241/46.11

Primary Examiner—Harvey C. Hornsby
Assistant Examiner—Alan I. Cantor
Attorney, Agent, or Firm—Brisebois & Kruger

[57] ABSTRACT

A mixing machine comprises a circular rotary dished platform having a driving mechanism by which it is rotatable about a vertical central axis, a wall which closely surrounds the platform and extends upwards from the rim of the platform, but which does not partake in the rotation of the platform, two conveyors or other means for supplying two or more materials to be mixed together either continuously or batch by batch to the platform and means for discharging mixed material from the platform by centrifugal action as the platform rotates. The discharging means may consist of a discharge port formed in the wall and this port may then either be permanently open so that materials which are supplied continuously are also discharged continuously after mixing or the port may have a closure by which it can be opened and closed to discharge the mixed materials batch by batch. When the port is permanently open, the materials are preferably supplied to the platform just downstream in the direction of rotation of the port and a radial baffle is provided between the conveyors or other supply means and the port.

13 Claims, 6 Drawing Figures

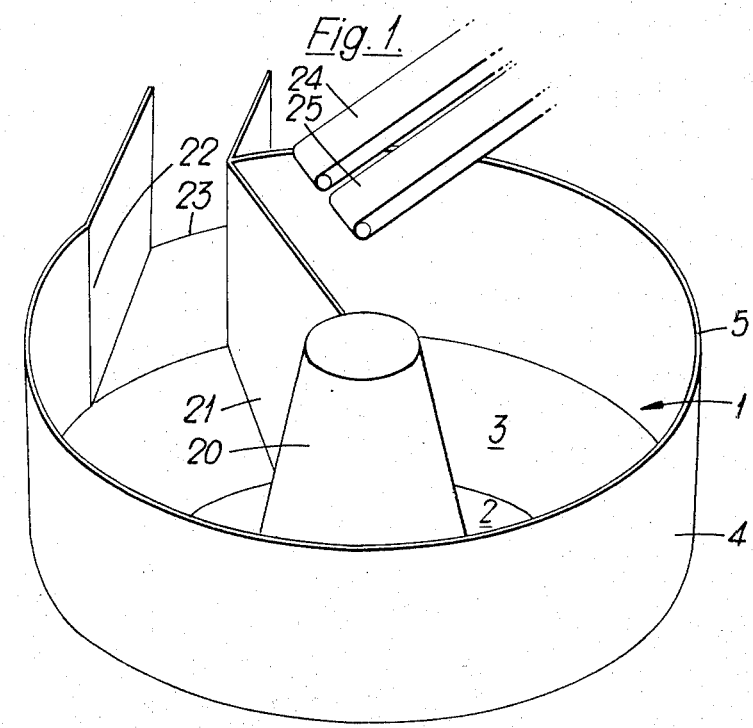
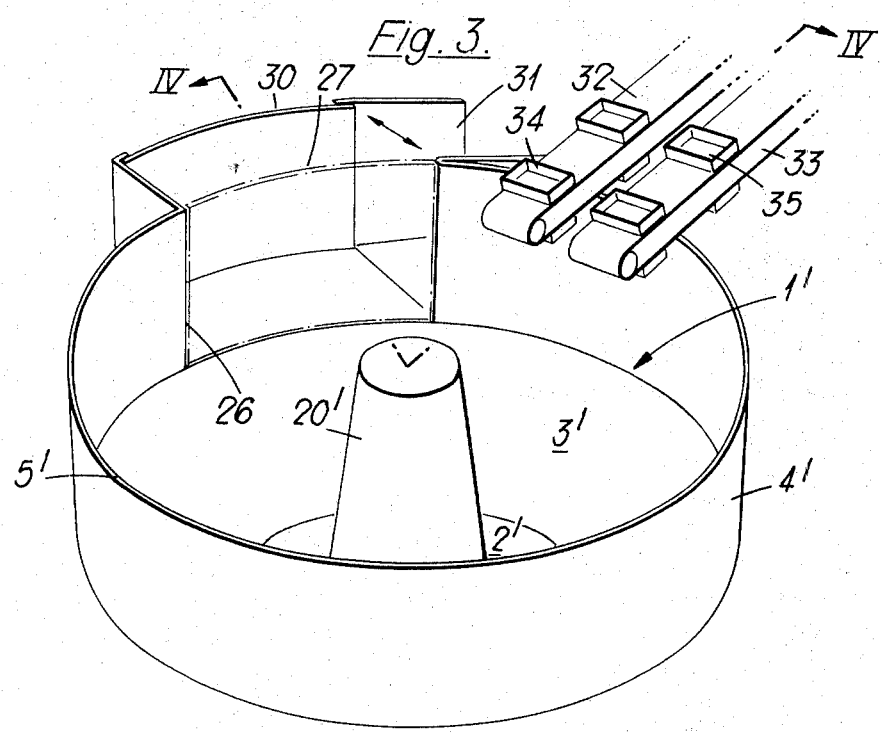

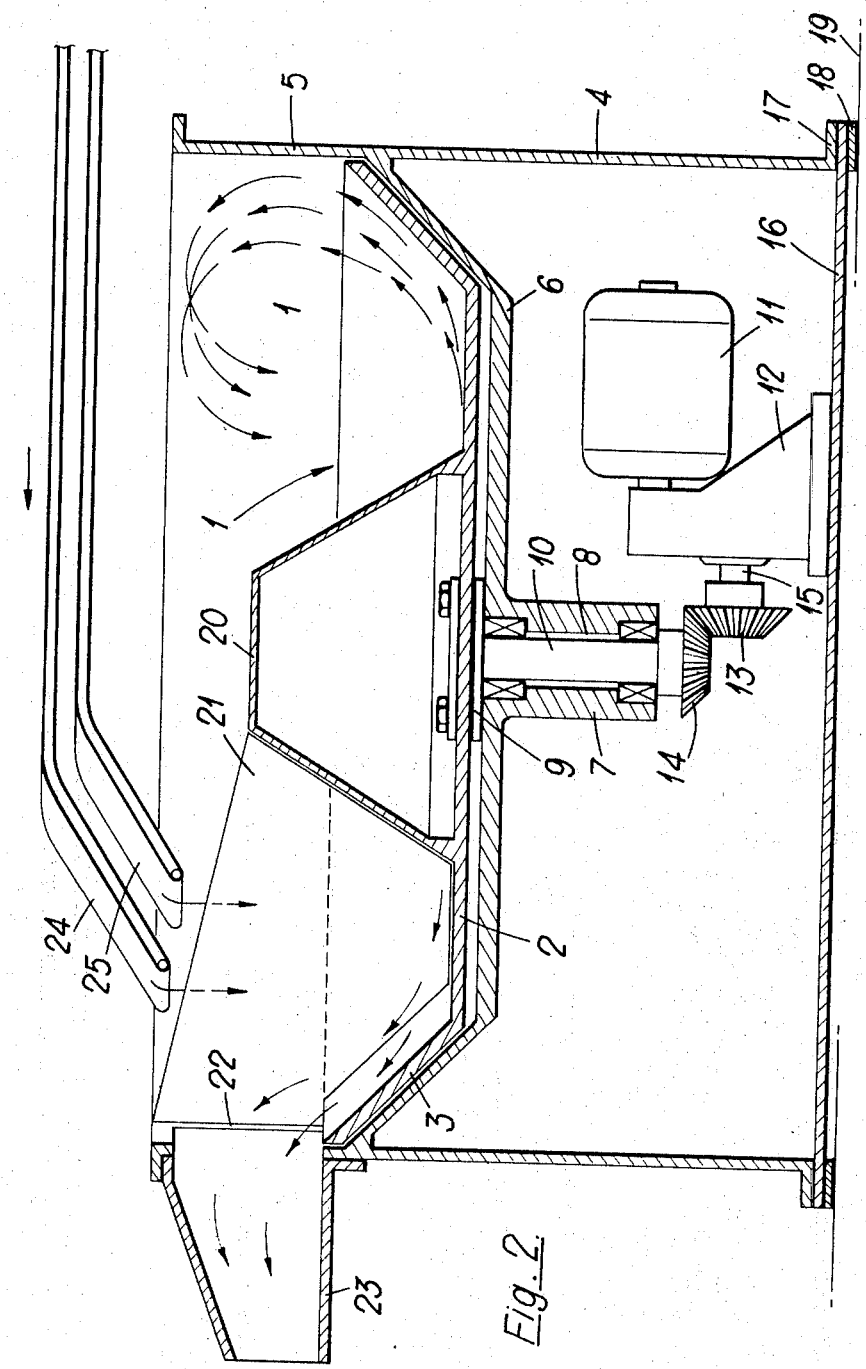

MIXING MACHINES

An apparatus which has been used for grinding powdered material and also the surface finishing of metal workpieces comprises a circular rotary dished platform having a driving mechanism by which it is rotatable about a vertical central axis and an upright wall which closely surrounds the platform and extends upwards from the rim of the platform. The surrounding wall does not partake of the rotary movement of the platform and it is preferably stationary although alternatively it may rotate in the same direction as, but more slowly than the platform, or it may rotate in the opposite sense from the platform.

In use, the powdered material to be ground, or particulate grinding material when the apparatus is used for surface finishing, is placed on the platform and as the platform rotates the powdered or particulate material is flung centrifugally outwards and is directed upwards against the surrounding wall owing to the dished shape of the platform. The powdered or particulate material is slowed down in its rotary movement by its contact with the surrounding wall and is deflected inwards again towards the centre of the platform. Owing to this motion, the mass of powdered or particulate material assumes a toroidal shape and the individual particles circulate around a path which extends helically around the toroid.

The particle velocities may be very high and the velocities vary from particle to particle very substantially across the radial section of the toroid. We have now discovered that because of this particle movement, the apparatus which has previously been used for grinding powdered material or surface finishing metal workpieces may be adapted for mixing together two or more powdered materials, or powdered or liquid materials in large volumes and with extreme rapidity and mixing efficiency.

To this end, according to this invention, a mixing machine comprises a circular rotary dished platform having a driving mechanism by which it is rotatable about a vertical central axis, a wall which closely surrounds the platform and extends upwards from the rim of the platform, but which does not partake in the rotation of the platform, means for supplying two or more materials to be mixed together either continuously or batch by batch to the platform, and means for discharging mixed material from the platform by centrifugal action as the platform rotates.

The means for discharging the mixed material from the platform may consist of a discharge port formed in the wall and this port may then either be permanently open or it may have a closure by means of which it can be opened and closed.

The mixing action brought about by the particle movement around the toroid is so efficient that with many materials full mixing may take place in the passage of the materials to be mixed just once around the upright wall. It is because of this mixing efficiency that it is possible for the machine to be provided with a discharge port which is permanently open and in this case the machine is provided with a baffle which extends inwards from the wall immediately above the platform and downstream of the open port in the direction of rotation of the platform. The supply means then supplies the two or more materials continuously to the platform directly on the side of the baffle remote from the port.

The feeding means is arranged to meter the supply of the materials continuously so that the materials to be mixed together are supplied in the required proportions and as the materials are discharged onto the platform and the platform rotates, the materials follow their helical paths around the toroid and when they reach the discharge port they are ejected tangentially and are assisted in their rejection by the upstream face of the baffle. The particle movement of the materials within the toroid is so rapid and complex that the materials are completely mixed together by the time they reach the port.

It has been found that the peripheral speed of the platform should generally be at least 400 ft. per minute and this corresponds to the speed of a little over 60 revolutions per minute with a platform diameter of 2 ft. There is some angular slippage between the materials in the toroid and the platform, but nevertheless even at this comparatively slow speed, the materials may pass from the feeding means to the discharge port in only a second or two and therefore the throughput of the machine per hour may be more than 1,000 times the capacity of the platform at any instant. Thus an extremely compact and simple machine may produce a very large output of intimately mixed materials.

Feeding devices for providing a continuous metered feed of two or more materials in very precise proportions to each other are complex and expensive and therefore, where very accurate proportioning is necessary, it is frequently preferable to operate the machine on a batch basis. It is in this case that the port has a closure to enable it to be opened and closed and then the means for moving the closure to open and close the discharge port and the means for supplying the materials batch by batch are arranged to operate in timed relationship with each other in such a way that batches of the material to be mixed are discharged onto the platform and then after a predetermined mixing time the discharge port is opened. The discharge port is kept open until the whole of the mixed material has been discharged and it is then closed again and further batches of the materials to be mixed together are fed to the platform.

The mixing time between the discharge of the batches of materials and the opening of the discharge port is set according to the mixing requirements and, in particular, on the nature of the materials to be mixed, but as an example, mixing times of between 3 and 5 seconds have been found to be adequate for most materials and approximately 1 further second is necessary for the port to remain open for the discharge of the mixture. It is therefore possible to mix between 600 and 900 batches of material per hour so that again a very large output per hour can be obtained from a machine having a very much smaller instantaneous capacity.

As an alternative to providing a discharge port in the wall, the discharge means may be formed by a mechanism for bringing about relative axial movement between the platform and the wall to bring the rim of the platform clear of either the upper or lower edge of the wall to cause all the mixed material to be discharged through the space between the rim and the wall.

The platform may be fixed in an axial direction and in this case the surrounding wall is mounted so that it can be moved axially either upwards or downwards. It is preferred, however, for the surrounding wall to remain fixed in position both angularly and axially and for the platform to be mounted so that during mixing it is rotated with its rim closely surrounded by the upright wall and the platform is then moved axially either upwards or downwards clear of the wall to enable discharge to take place.

With this arrangement, discharge takes place around the whole of the periphery of the platform and the discharge of a mixed batch of materials can take place very much more rapidly than it can through a port in the surrounding wall.

Mixing machines in accordance with the invention may be made suitable for mixing a very wide variety of different materials and also for a wide variety of proportions of one material to another. For example, the machine may be used for mixing concrete consisting of cement, coarse aggregate, fine aggregate and water, where the proportions of the various materials are of the same order of weight as each other, or the machine may be used for mixing additives with animal or other food stuffs. In this case the additives may form a very small proportion, of only a fraction of one percent, of the total food stuff.

When liquid forms one component of the mixture, for example when mixing concrete as mentioned above, a shaft on which the platform is mounted may be made hollow and be provided with ports through its wall above the platform. The liquid is then supplied by a metering pump through the shaft whence it flows out through the ports. Liquid discharged through these ports may also subsequently be used for cleaning the machine.

Four examples of machines constructed in accordance with the invention will now be described with reference to the accompanying drawings in which:

FIG. 1 is a diagrammatic perspective view as seen from above of one example;

FIG. 2 is a diametric section through the example shown in FIG. 1;

FIG. 3 is a diagrammatic perspective view as seen from above of a second example;

Figure 4:
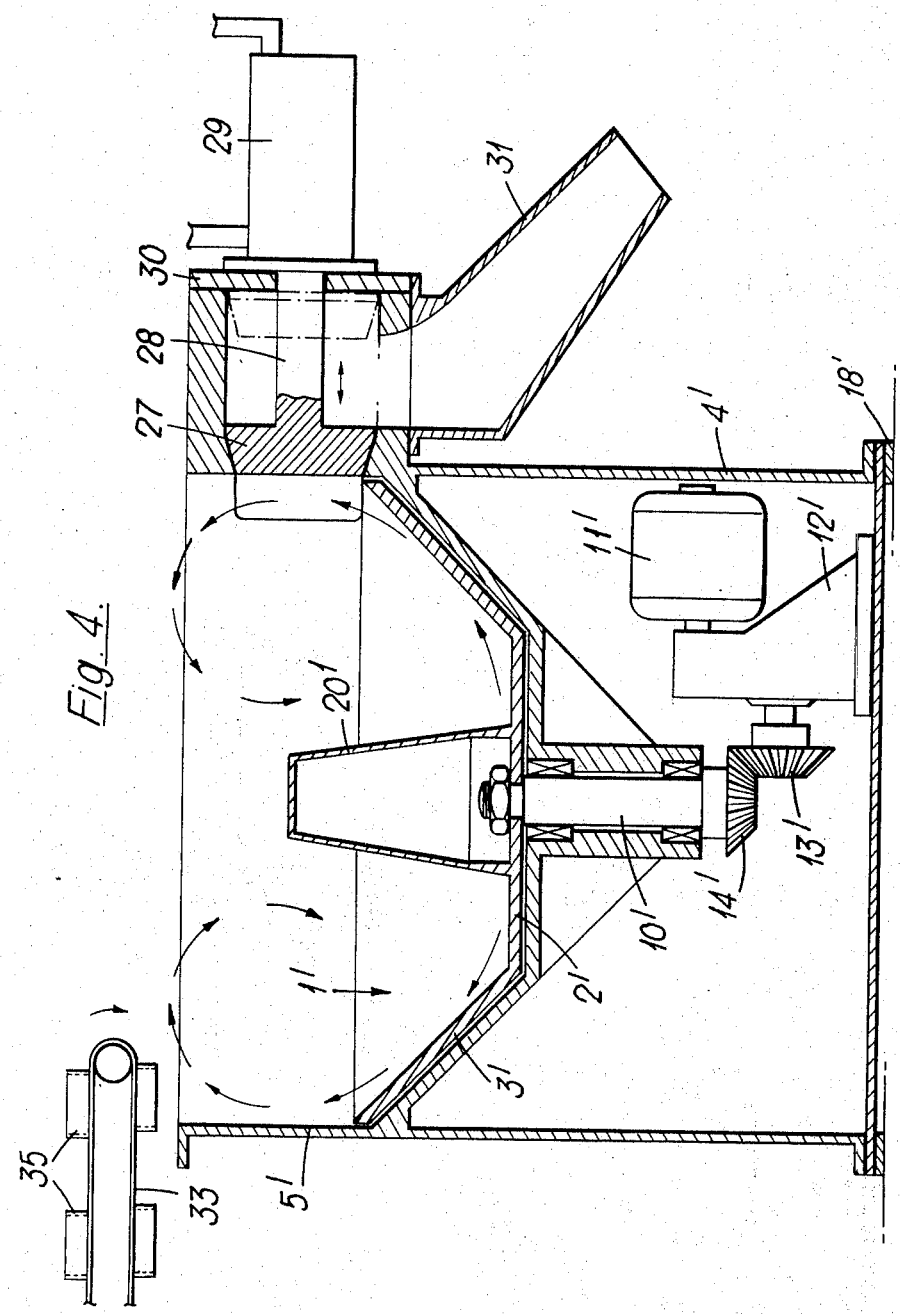
FIG. 4 is a section through the second example as seen in the direction of the arrows on the line IV—IV in FIG. 3.

The first example shown in FIGS. 1 and 2 comprises a circular rotary platform 1 having a circular disc-shaped centre part 2 and a part-conical outer part 3 together making the platform of dish-like shape. The platform 1 is mounted within a cylindrical housing 4 the lower part of which forms a casing for a driving mechanism and the upper part of which forms a vertical cylindrical wall 5 which closely surrounds the rim of the platform 1. The housing 4 is divided by a partition 6 which closely underlies the platform 1 and supports a central sleeve 7 holding a bearing 8. The platform 1 is fixed to a flange 9 at the upper end of a driving shaft 10 which is supported in the bearing 8.

The driving shaft 10 is rotated by an electric motor 11 acting through a reduction gear box 12 and bevel pinions 13 and 14. The pinion 13 is mounted on an output shaft 16 of the gear box 12 and the pinion 14 is mounted on the lower end of the shaft 8. The gear box 12 forms also a supporting bracket for the motor 11 and is mounted on a base plate 16 which forms the bottom wall of the housing 4. The periphery of the base plate 16 is sandwiched between a flange 17 on the housing 4 and a vibration damping ring 18 and the machine as a whole is held down on a foundation 19 by bolts passing through the flange 17, the plate 16 and the ring 18.

At the centre of the platform 1 there is an upwardly projecting truncated conical boss 20 and projecting radially inwards from the vertical wall 5 up to the boss 20 is a baffle 21. The platform 1 is rotated clockwise as seen from above by the motor 11 and immediately upstream, in relation to this direction of rotation, of the baffle 21 there is an open port 22 in the wall 5. The port 22 leads to a discharge chute 23.

Directly downstream of the baffle 21, that is on the side of the baffle 21 remote from the port 22 are two feed conveyors 24 and 25. The feed conveyors 24 and 25 are indicated in the drawings as being vibratory chutes, but they may alternatively be more steeply inclined stationary chutes or they may both be endless belt conveyors. Material to be mixed in the machine is supplied in the required proportions by continuous metering devices to the conveyors 24 and 25 and these in turn discharge the materials into the mixing machine. In use, the platform 1 is set in rotation and in this example the speed of rotation is such that the peripheral speed of the platform is 400 ft. per minute. With the platform 1 rotating continuously, the metering devices and the feed conveyors 24 and 25 are set in operation so that the two materials to be mixed together are discharged continuously in the required proportions onto the platform 1 immediately downstream of the baffle 21. Owing to the rotation of the dished platform 1 relative to the stationary vertical wall 5, the granular materials discharged from the conveyors 24 and 25 form a toroidal mass around the outer part of the platform 1 with the particles moving very rapidly and in a complex manner helically around the toroid as already described. By the time the materials reach the discharge port 22, they are already intimately mixed together and they are caused to flow by centrifugal force aided by the baffle 21 out through the port 22 and thence down the discharge chute 23. Mixing carries on continuously so long as the metering devices and the conveyors 24 and 25 are kept in operation and the platform 1 is rotated by the motor 11.

The second example shown in FIGS. 3 and 4 of the drawings is generally similar to the first example in some respects in that it has a platform 1' with a central flat portion 2' and a truncated conical outer portion 3' and it is mounted on a shaft 10' which is driven from a motor 11' to a gear box 12' and pinions 13' and 14'. The platform 1 is surrounded by a housing 4' the upper part of which forms a vertical cylindrical wall 5'. Further, the platform 1' has a central boss 20'.

However, the wall 5', instead of being provided with a permanently open port 22, has a port 26 having a closure plate 27 mounted on a piston rod 28 of a pneumatic ram 29. When the ram 29 is extended, the plate 27 fills and closes the port 26 and forms a continuation of the cylindrical wall 5'. When the ram 29 is retracted, the plate 27 is moved radially outwards against a back wall 30 of a discharge chute 31.

Immediately downstream of the port 26 there are two material supply conveyors 32 and 33. In this example these conveyors are endless belts, but instead of being driven continuously, they are driven step by step and they carry scoops 34 and 35. The scoops 34 and 35 are filled one with each of the two powdered materials to be mixed together and as the belts 32 and 33 are moved through one step, one, or if required more scoops on each of the belts are discharged onto the platform 1'. At the time that discharge takes place, the ram 29 is extended so that the port 26 is closed and the powdered material on the platform becomes a moving toroidal mass as in the first example. The material continues to circulate helically around the toroid for as long as is required and this may be during its passage one or more times around the wall 5'. As soon as the required mixing time has elapsed, the ram 29 is retracted so that the port 26 is opened and the mixed materials are discharged through the port and down the chute 31 in the same way as the materials are discharged in the first example through the permanent open port 22. In this case, though, there is no baffle 21 to assist discharge, but the port 26 is kept open until discharge is complete. As soon as this happens, the port 26 is closed again by extending the ram 29 and the conveyors 32 and 33 are moved through another step to discharge a further batch of the two materials.

The pneumatic ram 29 and the conveyors 32 and 33 are all preferably electrically operated and their controls are electrically interlocked in such a way that the conveyors 32 and 33 are moved to discharge a batch of materials and the ram 29 is retracted to discharge the mixed materials and is then extended again sequentially to enable batch after batch of materials to be mixed in succession automatically.

Figure 5:
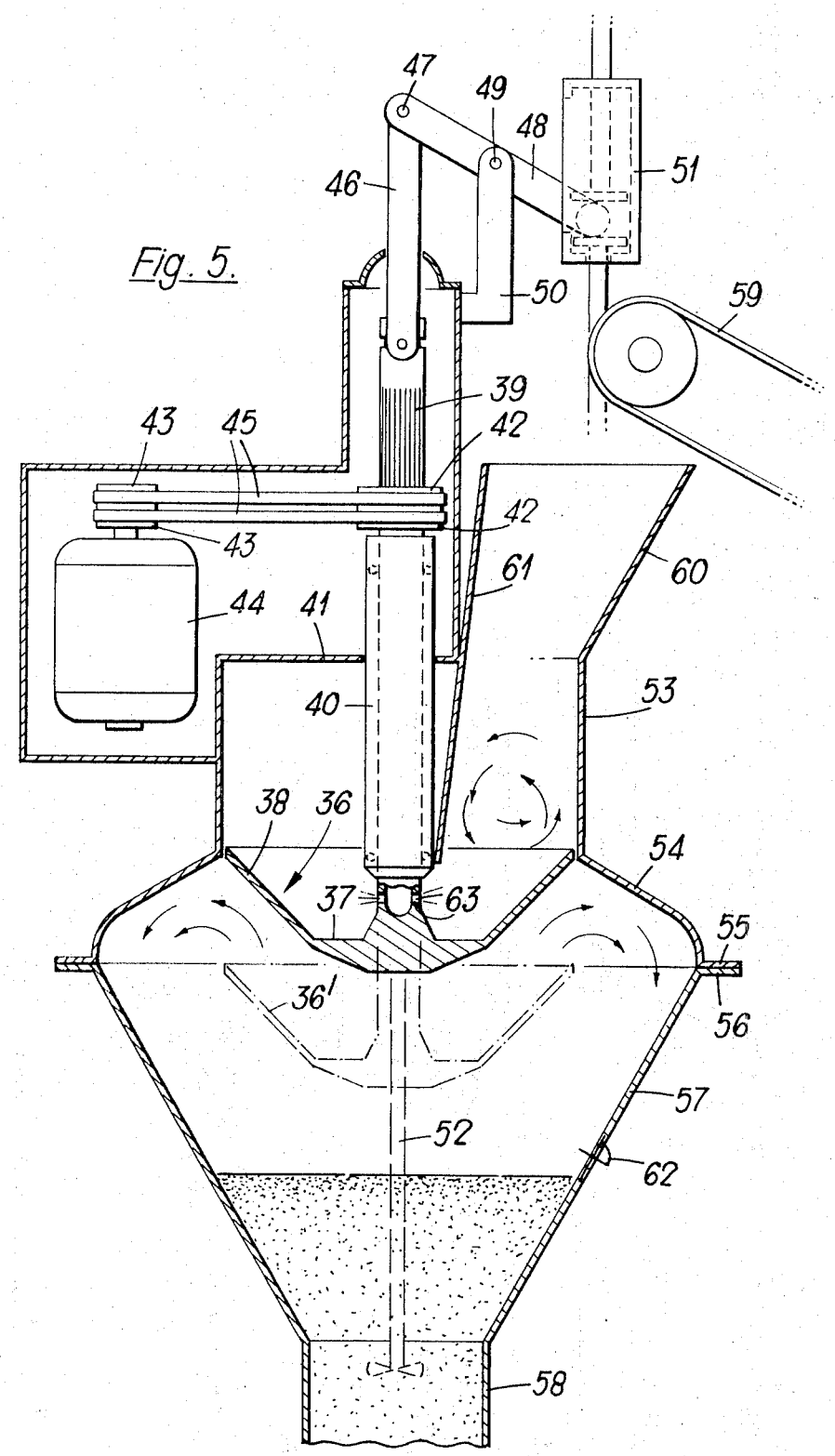
FIG. 5 is a side view partly in diametric section of a third example.

In the third example shown somewhat diagrammatically in FIG. 5 of the drawings, a platform 36 having a flat central portion 37 and a truncated conical outer portion 38 is fixed on the bottom end of a tubular shaft 39. The shaft 39 is both rotatable and axially movable within a bearing bush 40 which is supported from a bracket 41. The shaft 39 is driven by a pair of V-belt pulleys 42 which are splined to the shaft 39 so that the shaft can move axially within them and the pulleys 42 are in turn driven from pulleys 43 on the output shaft of a motor 44 through twin-belts 45.

Connected to the top of the shaft 39 is a pivoted link 46 which is in turn connected by a pivot 47 to a two-armed lever 48 which has a fulcrum 49 on an arm 50 projecting from the upper end of the bracket 41. The end of the lever 48 remote from the pivot 47 is acted upon by a two-way pneumatic ram 51 so that it can be moved upwards and downwards and in so moving moves the platform 36 upwards and downwards between an upper position shown in full lines in FIG. 5 and a lower position shown in chain dotted lines at 36'.

The tubular shaft 39 may optionally hold a concentric tube 52 which projects out of the bottom end of the shaft 39 below the platform 36.

The rim of the platform 36 is closely surrounded by a vertical cylindrical wall 53 which supports the bracket 41 and is itself supported on the top of a wall 54 which flares outwards from the bottom edge of the wall 53. The outwardly flaring wall 54 has a peripheral flange 55 which is bolted to a similar flange 56 at the top of a part-conical funnel 57. The funnel 57 leads downwards to a discharge pipe 58 and the whole machine is supported from the funnel 57 which is fixed to a supporting bracket, which is not shown, but which extends upwards from a base.

Above the top of the vertical cylindrical wall 53 diametrically opposite the motor 24 are two fed conveyors arranged side by side and one of which is shown at 59. These conveyors are similar to the conveyors 32 and 33 shown in the second example and operate in the same manner. An extension 60 extends upwards from the wall 53 to a position immediately below the conveyors 59 and a deflector plate 61 is fixed to the bracket 41 and extends downwards beside the bearing bush 40 to ensure that all the material discharged from the conveyors 59 falls directly downwards onto the platform 36.

In use, batches of the two materials to be mixed together are supplied by the conveyors 59 to the platform 36 which has already been set in motion by the motor 44. At this time the platform 36 is in its upper position as shown in full lines in FIG. 5 with its rim closely surrounded by the bottom edge of the vertical wall 53. As soon as mixing together of the two materials has been completed in the same manner as with the previous example, the ram 51 is operated to rock the lever 48 in a counter-clockwise direction and move the platform 36 downwards into its lower position as shown at 36'. During this movement rotation of the platform 36 continues so that all the mixed material on the platform is discharged centrifugally outwards all the way around the platform between the rim of the platform and the bottom of the wall 53 and the discharged material is directed downwards by the wall 54 into the funnel 57 whence it is carried away through the discharge pipe 58.

If the mixed materials are of a cohesive nature, they may tend to stick and arch in the funnel 57 and to ensure that the mixed materials flow away through the pipe 58, the upper end of the tube 52 may be connected to a supply of air under pressure so that the material in the funnel 57 is agitated or fluidised to enable it to flow freely away. To ensure that any blockage of the pipe 58 does not cause the mixed material in the funnel 57 to rise up and jam under the platform 26, which might damage the machine, a level switch 62 may be provided in the wall of the funnel 57 and when the material reaches this level switch, the switch is operated and switches off the motor 44, the conveyors 59 and the valves controlling the ram 51 so that the machine is put out of operation until the material has been cleared.

If it is required to incorporate a liquid in the mixture of materials supplied by the conveyors 59, the upepr end of the tubular shaft 39 may be connected through a rotary coupling to a supply of liquid under pressure and the liquid then flows through the shaft 39 and issues from ports 63 through the wall of the shaft 39 just above the platform 36. The flow of liquid may be controlled by a solenoid operated valve so that it is supplied as required at the same time as the conveyors 59 are operated to supply the powdered materials. The solenoid valve when provided together with the controls of the conveyors 59 and the ram 51 may be electrically interlocked to cause them to operate automatically in the required sequence as with the third example.

Figure 6:
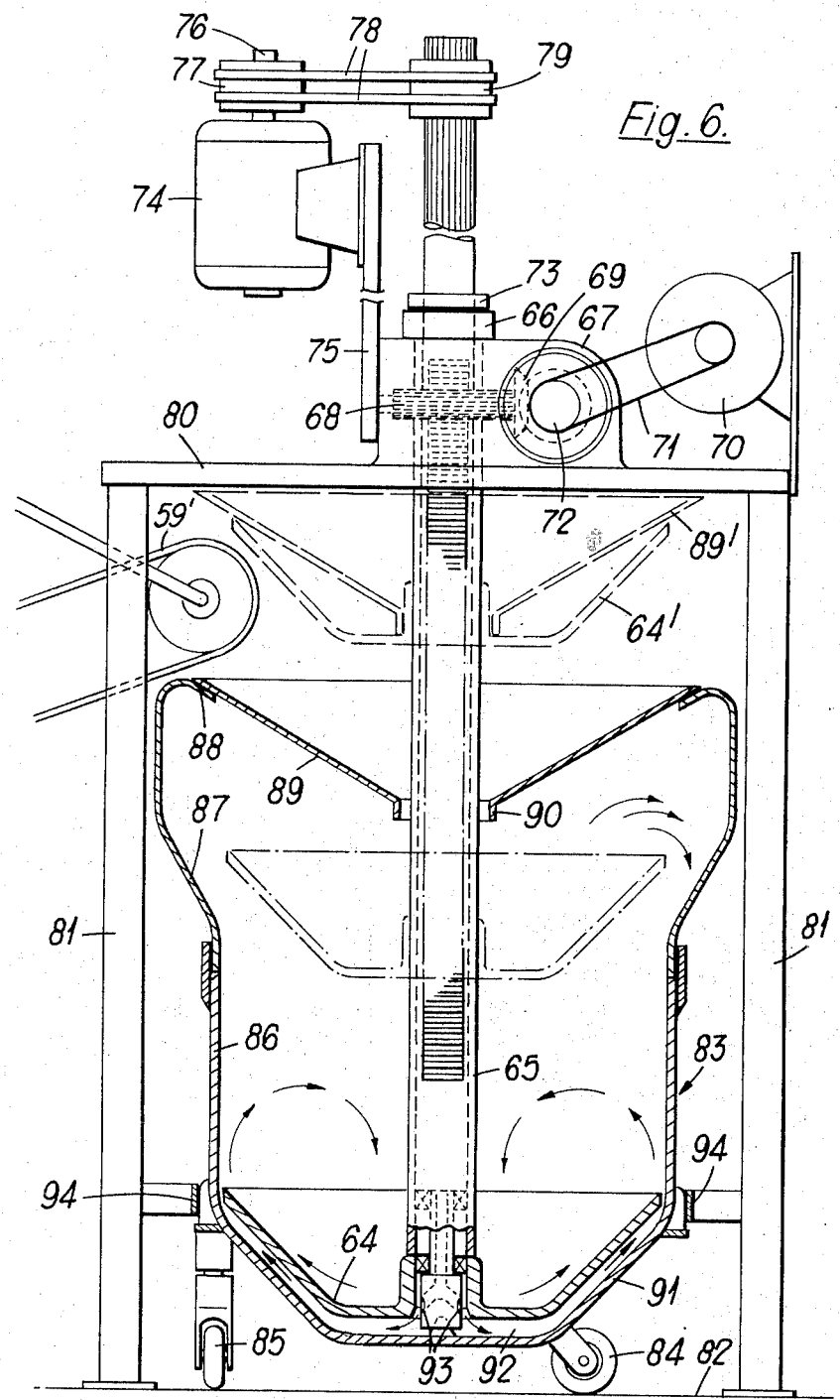
FIG. 6 is a side view partly in diametric section of a fourth example.

In the last example shown in FIG. 6 of the drawings, a platform 64 is fixed on the bottom end of a tubular driving shaft 65 which is mounted so that it can both rotate and slide axially within a bearing 66 carried in a block 67. The outside of the shaft 65 below the bearing 66 is provided with a series of rack-like teeth along a substantial part of its length and these teeth mesh with the teeth of a pinion 68 which is rotatable through a bevel gearing 69 by a motor 70 acting through a belt 71 and a pulley 72. Thus, by operating the motor 70, the pinion 68 is rotated and causes the shaft 65 and with it the platform 64 to move upwards or downwards in dependence upon the direction of rotation of the motor 70. The downward movement of the shaft 65 is restricted by a thrust collar 73 which is fixed on the shaft 65 and comes into engagement with the top of the bearing 66 when the platform 64 is in its lowermost position.

The shaft 65 and with it the platform 64 are rotatable by means of a motor 74 which is mounted on a bracket 75 projecting upwards from the block 67 and which has an output shaft 76 carrying twin belt pulleys 77. The pulleys 77 drive twin V-belts 78 and these in turn drive pulley 79 which are splined on the shaft 65. The pulleys 79 are located axially by a support which is not shown, so that when the motor 70 is operated the shaft 65 slides axially through the pulley 79, but continues to be rotated by them.

The block 67 is mounted on a plate 80 which is in turn supported on legs 81 which forms an open frame and have their lower ends fixed to a base 82.

A vessel 83 is mounted on a pair of wheels one of which is shown at 84 and on a castor wheel 85. The vessel 83 comprises a vertical cylindrical wall 86 with a wall 87 flaring outwardly from its top and having an inturned lip 88 above it. A part-conical lid 89 is supported on the lip 88 and has a central opening 90 through which the shaft 65 passes.

Below the wall 86, the vessel 83 has a bottom 91 which is similar in shape to that of the platform 64 and closely underlies the platform 64 when this is in its lowermost position as shown in full lines in FIG. 6. The wall 86 closely surrounds the rim of the platform 64 and there is a small clearance space 92 between the bottom 91 in the underside of the platform 64. In use the space 92 is purged with air which is supplied through a swivel coupling at the upper end of the shaft 65 and flows downwards through the shaft and out of ports 93 at its lower end.

The vessel 83 is detachably held in position between the legs 81 by a jig 94 which locates the vessel 83 so that its wall 86 is accurately concentric with the axis of rotation of the platform 64.

Mounted above the lip 88 are two batch feed conveyors similar to the conveyors 32 and 33 in the second example except that they are mounted on a movable support so that they can be swung away well clear of the vessel 83. Only one of these conveyors 59' is visible in FIG. 6.

In operation, the motor 70 is operated to move the shaft 65 and with it the platform 64 upwards into an uppermost position shown at 64'. As the platform rises, it lifts the lid 89 with it into the position shown at 89'. With the platform and lid in these uppermost positions, the vessel 83 can be moved on its wheels into the position shown in FIG. 6 where it is located by the jig 94. The platform 64 is then moved downwards into its lowermost position and in its passage, it deposits the lid 89 on the lip 88. The batch feed conveyors are then operated to supply batches of the two materials to be mixed together onto the lid 89 whence they slide downwards through the opening 90 around the shaft 65 onto the platform 64. The platform 64 is then rotated to mix the materials together in the manner already described and during this time the space 92 is purged with air.

As soon as mixing is complete, which is after a few seconds, the motor 70 is operated again to raise the platform 64 to an intermediate position 64" in which its rim is above the upper edge of the cylindrical wall 86 and is surrounded with a clearance by the outwardly flaring wall 87. During this upward movement rotation of the platform 64 continues so that the mixed material is discharged from the platform very rapidly around its whole periphery whence it passes downwards into the bottom of the vessel 83. The platform 64 is then raised further to its uppermost position 64' and the vessel 83 is wheeled away containing the mixed material. Its place is then taken immediately by another identical vessel and another mixing operation can at once take place.

I claim:

1. A mixing machine comprising a circular rotary dished platform, said platform including an uninterrupted radially inner portion and an annular outermost portion surrounding said inner portion and extending outwardly and upwardly at an inclination therefrom, a driving mechanism operatively connected to said platform for rotating said platform about a vertical central axis, a stationary wall, means supporting said wall in a position closely surrounding said platform and extending upwards from the outer periphery of said annular outermost portion of said platform, means for supplying to said platform measured quantities in predetermind proportions of at least two materials to be mixed together on said platform, and means through which mixed material is discharged from said platform by centrifugal action as said platform rotates.

2. A mixing machine as claimed in claim 1, wherein said means for discharging said mixed material comprises means defining a port through said wall.

3. A mixing machine as claimed in claim 2, wherein said port is permanently open and further comprising baffle means extending inwards from said port immediately above said platform and downstream of said port in the direction of rotation of said platform, said means for supplying said materials being located to discharge said materials onto said platform beside said baffle means and on the side thereof remote from said port.

4. A mixing machine as claimed in claim 2, further comprising closure means for said port and means operating said closure means for opening and closing said port, and said means for supplying said materials being arranged to discharge said materials batch by batch.

5. A mixing machine as claimed in claim 1, wherein said means for discharging said mixed materials comprises a mechanism for causing relative axial movement between said platform and said wall to bring the periphery of said platform clear of either an upper or lower edge of said wall to define a gap between said periphery and said wall and cause said mixed material to be discharged through said gap.

6. A mixing machine as claimed in claim 5, wherein said means mounting said wall causes said wall to be fixed both angularly and axially in a stationary position.

7. A mixing machine as claimed in claim 6, wherein said mechanism for causing relative axial movement is adapted to move said platform upwards or downwards clear of said wall.

8. A mixing machine as claimed in claim 7, wherei said mechanism is adapted to move said platform clear of the bottom of said wall, and wherein an outwardly flaring wall extends downwards from said wall, a discharge funnel below said outwardly flaring wall and means connecting said outwardly flaring wall to said funnel.

9. A mixing machine as claimed in claim 7, wherein said mechanism is adapted to move said platform clear of the top of said wall and further comprising an outwardly flaring wall extending upwards from said wall.

10. A mixing machine as claimed in claim 9, wherein said upwardly extending wall and said outwardly flaring wall together from a separate vessel, and said machine further comprising means detachable fixing said vessel in position coaxially with said platform, and said vessel including a saucer-shaped bottom extending below said platform.

11. A mixing machine as claimed in claim 10, wherein said vessel further comprises wheels and said machine includes a framework, a vertical driving shaft, means mounting said shaft in said framework, means fixing said platform to the lower end of said shaft, means for moving said shaft upwards and downwards relative to said framework and means for clamping said vessel stationary in said framework, said means for moving said shaft upwards and downwards being operative to move said platform clear of the top of said vessel to enable said vessel to be removed on said wheels on release of said clamping device.

12. A mixing machine as claimed in claim 11, wherein said vertical shaft is tubular and includes means defining an outlet from the bore thereof below said platform and coupling means for the connection of a supply of compressed air to the upper end thereof.

13. A mixing machine as claimed in claim 1, further comprising a tubular rotary shaft, means mounting said platform on said rotary shaft, means defining ports through said shaft above said platform and means for supplying liquid under pressure to said shaft to enable said liquid to be incorporated as a part of said mixture.

* * * * *